US009007695B2

(12) United States Patent
Ohtomo et al.

(10) Patent No.: US 9,007,695 B2
(45) Date of Patent: Apr. 14, 2015

(54) SPECTRAL IMAGE SENSOR DEVICE (71) Applicant: Kabushiki Kaisha TOPCON, Itabashi-ku, Tokyo-to (JP)

(72) Inventors: Fumio Ohtomo, Asaka (JP); Masayuki Momiuchi, Tokyo-to (JP); Kazuki Osaragi, Tokyo-to (JP); Hitoshi Otani, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 241 days.

(21) Appl. No.: 13/626,109

(22) Filed: Sep. 25, 2012

(65) Prior Publication Data

US 2013/0077176 A1    Mar. 28, 2013

(30) Foreign Application Priority Data

Sep. 28, 2011 (JP) ................. 2011-212478

(51) Int. Cl.

| G02B 27/14 | (2006.01) |
|---|---|
| H04N 5/33 | (2006.01) |
| G02B 26/00 | (2006.01) |
| G01J 3/28 | (2006.01) |
| G01J 3/32 | (2006.01) |
| G01J 3/02 | (2006.01) |
| G01J 3/12 | (2006.01) |
| H04N 9/04 | (2006.01) |

(52) U.S. Cl.
CPC .............. *H04N 5/332* (2013.01); *G02B 26/008* (2013.01); *G01J 3/2823* (2013.01); *G01J 3/32* (2013.01); *G01J 2003/1226* (2013.01); *G01J 3/0208* (2013.01); *G01J 3/0229* (2013.01); *H04N 9/045* (2013.01)

(58) Field of Classification Search
USPC .................................................. 359/629, 634
See application file for complete search history.

(56) References Cited

U.S. PATENT DOCUMENTS 7,804,996 B2    9/2010   Ohtomo et al.

FOREIGN PATENT DOCUMENTS

| JP | 2006-10376 A | 1/2006 |
| JP | 2011-89895 A | 5/2011 |

*Primary Examiner* — Jack Dinh
(74) *Attorney, Agent, or Firm* — Nields, Lemack & Frame, LLC (57) ABSTRACT

A spectral image sensor device comprises a first optical system 47 and 48 including an objective lens, a luminous fluxes selecting member 55 for allowing a part of the luminous fluxes to pass via the first optical system selectively, an optical member 58 where the luminous fluxes selecting member is disposed so as to be at focal position on an object side or approximately at focal position on an object side, and an interference membrane is formed, and wavelength range of the luminous fluxes for passing through the luminous fluxes selecting member is selected, depending on position of the luminous fluxes selecting member, a second optical system 49 for guiding the luminous fluxes toward the optical member, and an image sensor 52 for receiving a light in wavelength range as selected by the optical member.

12 Claims, 10 Drawing Sheets

SPECTRAL IMAGE SENSOR DEVICE

BACKGROUND OF THE INVENTION

The present invention relates to a spectral image sensor device for acquiring a spectral image in a predetermined wavelength range.

A hyper-spectral camera is known as one of spectral image sensor devices for acquiring a spectral image. The hyper-spectral camera is an image pickup device for separating a light from an object to be measured to a plurality of wavelength ranges as defined by hyper-spectra and for acquiring an image for each of the wavelength ranges. The hyper-spectral camera is primarily mounted on board of an artificial satellite or on an aircraft and is applied in agricultural and environmental or other purposes. In future, it is expected to be used in the fields of medical services, food industry, etc.

The hyper-spectral camera separates a light passing through a slit, which fulfills the function as a diaphragm of field of view, to spectral components through a diffraction grating, and acquires a spectral image for field of view of the slit. By moving the slit, the hyper-spectral camera acquires a spectral image of field of view of the camera.

However, the conventional type hyper-spectral camera can obtain only a one-dimensional spectral image at one time because the conventional type hyper-spectral camera takes images by separating the light in a limited range to spectral components through a diaphragm of field of view by the diffraction grating. Further, higher cost is required because the diffraction grating is very expensive.

The Japanese Patent Publication JP-A-2011-89895 discloses a hyper-spectral image pickup device and a hyper-spectral image pickup method, which makes the light from an object to be photographed pass through a slit, separates the light passing through the slit is to a plurality of wavelength ranges via the diffraction grating, makes an image sensor receive the light for each of the wavelength ranges separated and produces a two-dimensional image based on the light received by the image sensor.

SUMMARY OF THE INVENTION

It is an object of the present invention to provide a spectral image sensor device, by which it is possible to acquire a spectral image in a predetermined wavelength range by means of a device with simple arrangement.

To attain the above object, a spectral image sensor device according to the present invention comprises a first optical system including an objective lens, a luminous fluxes selecting member for allowing a part of the luminous fluxes to pass via the first optical system selectively, an optical member where the luminous fluxes selecting member is disposed so as to be at focal position on an object side or approximately at focal position on an object side, and an interference membrane is formed, and wavelength range of the luminous fluxes for passing through the luminous fluxes selecting member is selected, depending on position of the luminous fluxes selecting member, a second optical system for guiding the luminous fluxes toward the optical member, and an image sensor for receiving a light in wavelength range as selected by the optical member.

Further, in the spectral image sensor device according to the present invention, the luminous fluxes selecting member has a slit, and a tele-centric optical system is constituted by the slit and the second optical system. Further, in the spectral image sensor device according to the present invention, the optical member is disposed at an image forming position or approximately at an image forming position of the tele-centric optical system. Further, in the spectral image sensor device according to the present invention, the optical member is disposed at tilted position with respect to the optical axis of the second optical system.

Further, in the spectral image sensor device according to the present invention, incident angle of the light entering the optical member is changed according to a position of the slit.

Further, in the spectral image sensor device according to the present invention, the optical member is a transmission type interference filter. Further, in the spectral image sensor device according to the present invention, the optical member is a reflection type interference filter.

Further, in the spectral image sensor device according to the present invention, the optical member is divided to a plurality of sites, and interference membranes with different wavelength characteristics are formed at each of the divided sites. Further, in the spectral image sensor device according to the present invention, changeover of wavelength characteristics due to the changeover of the plurality of sites is synchronized with change of the position of the luminous fluxes selecting member.

Further, in the spectral image sensor device according to the present invention, a full transmission range is provided at least in a part of the optical member, and the image sensor acquires at least a part of the light from the full transmission range as a real image at the same time as the spectral image.

Further, in the spectral image sensor device according to the present invention, a full reflection range is provided in at least a part of the optical member, and the image sensor acquires at least a part of the light from the full reflection range as a real image at the same time as the spectral image.

Further, in the spectral image sensor device according to the present invention, the real image and the spectral image are acquired at the same time, image matching is performed between real images, and positioning between a plurality of the spectral images is performed according to the image matching.

According to the present invention, the spectral image sensor device comprises a first optical system including an objective lens, a luminous fluxes selecting member for allowing a part of the luminous fluxes to pass via the first optical system selectively, an optical member where the luminous fluxes selecting member is disposed so as to be at focal position on an object side or approximately at focal position on an object side, and an interference membrane is formed, and wavelength range of the luminous fluxes for passing through the luminous fluxes selecting member is selected, depending on position of the luminous fluxes selecting member, a second optical system for guiding the luminous fluxes toward the optical member, and an image sensor for receiving a light in wavelength range as selected by the optical member. As a result, it is possible to easily acquire light spectrum of specific wavelength in a predetermined wavelength range. Also, it is easier to change a specific wavelength, to simplify the design of construction, and to reduce the cost.

Further, according to the present invention, in the spectral image sensor device, the luminous fluxes selecting member has a slit, and a tele-centric optical system is constituted by the slit and the second optical system. As a result, it is possible to ensure that incident angles of luminous fluxes guided by the optical member will be the same at all times.

Further, according to the present invention, in the spectral image sensor device, the optical member is disposed at an image forming position or approximately at an image forming position of the tele-centric optical system. As a result, no strict restriction is required on the setting of the position of the optical member.

Further, according to the present invention, in the spectral image sensor device, the optical member is disposed at tilted position with respect to the optical axis of the second optical system. As a result, it is possible to efficiently obtain the change of selection for the displacement of the luminous fluxes selecting member.

Further, according to the present invention, in the spectral image sensor device, incident angle of the light entering the optical member is changed according to a position of the slit. As a result, the specific wavelength in the predetermined wavelength range can be changed easily.

Further, according to the present invention, in the spectral image sensor device, the optical member is a transmission type interference filter. As a result, there is no need to use expensive diffraction grating, and reduction of the cost can be achieved.

Further, according to the present invention, in the spectral image sensor device, the optical member is a reflection type interference filter. As a result, there is no need to use expensive diffraction grating, and reduction of the cost can be achieved. Also, the length of the optical system itself can be shortened, and compact design can be realized.

Further, according to the present invention, in the spectral image sensor device, the optical member is divided to a plurality of sites, and interference membranes with different wavelength characteristics are formed at each of the divided sites. As a result, it is easier to change the specific wavelength.

Further, according to the present invention, in the spectral image sensor device, changeover of wavelength characteristics due to the changeover of the plurality of sites is synchronized with change of the position of the luminous fluxes selecting member. As a result, it is possible to facilitate the change of the wavelength of the light, which is to be received by the image sensor.

Further, according to the present invention, in the spectral image sensor device, a full transmission range is provided at least in a part of the optical member, and the image sensor acquires at least a part of the light from the full transmission range as a real image at the same time as the spectral image. As a result, it is possible to acquire a real image without providing a camera for photographing separately.

Further, according to the present invention, in the spectral image sensor device, a full reflection range is provided in at least a part of the optical member, and the image sensor acquires at least a part of the light from the full reflection range as a real image at the same time as the spectral image. As a result, it is possible to acquire a real image without providing a camera for photographing separately.

Furthermore, according to the present invention, in the spectral image sensor device, the real image and the spectral image are acquired at the same time, image matching is performed between real images, and positioning between a plurality of the spectral images is performed according to the image matching. As a result, there is no need to provide a camera for acquiring a real image for positioning separately, and reduction of the cost can be achieved.

BRIEF DESCRIPTION OF THE DRAWINGS

FIG. 1A and FIG. 1B each represents an explanatory drawing to show an optical system of a spectral image sensor device according to a first embodiment of the present invention. FIG. 1A shows a condition where a diaphragm orifice concurs with an optical axis, and FIG. 1B shows a condition where the diaphragm orifice is separated from the optical axis.

FIG. 4A and FIG. 4B each represents an explanatory drawing of an optical system of a spectral image sensor device according to a second embodiment of the present invention. FIG. 4A represents a condition where a diaphragm orifice concurs with the optical axis, and FIG. 4B represents a condition where the diaphragm orifice is separated from the optical axis.

FIG. 9A and FIG. 9B each represents an explanatory drawing to show an optical system of a spectral image sensor device according to a fourth embodiment of the present invention. FIG. 9A shows a condition where a diaphragm orifice concurs with the optical axis, and FIG. 9B represents a condition where the diaphragm orifice is separated from the optical axis.

FIG. 10A and FIG. 10B each represents an explanatory drawing to show an optical system of a spectral image sensor device according to a fifth embodiment of the present invention. FIG. 10A shows a condition where a diaphragm orifice concurs with the optical axis, and FIG. 10B represents a condition where the diaphragm orifice is separated from the optical axis.

FIG. 13A and FIG. 13B each represents an explanatory drawing to show an optical system of a spectral image sensor device according to a seventh embodiment of the present invention. FIG. 13A shows a condition where a diaphragm orifice concurs with the optical axis, and FIG. 13B represents a condition where the diaphragm orifice is separated from the optical axis.

DETAILED DESCRIPTION OF THE PREFERRED EMBODIMENTS

Description will be given below on embodiments of the present invention by referring to the drawings.

Figure 1A:
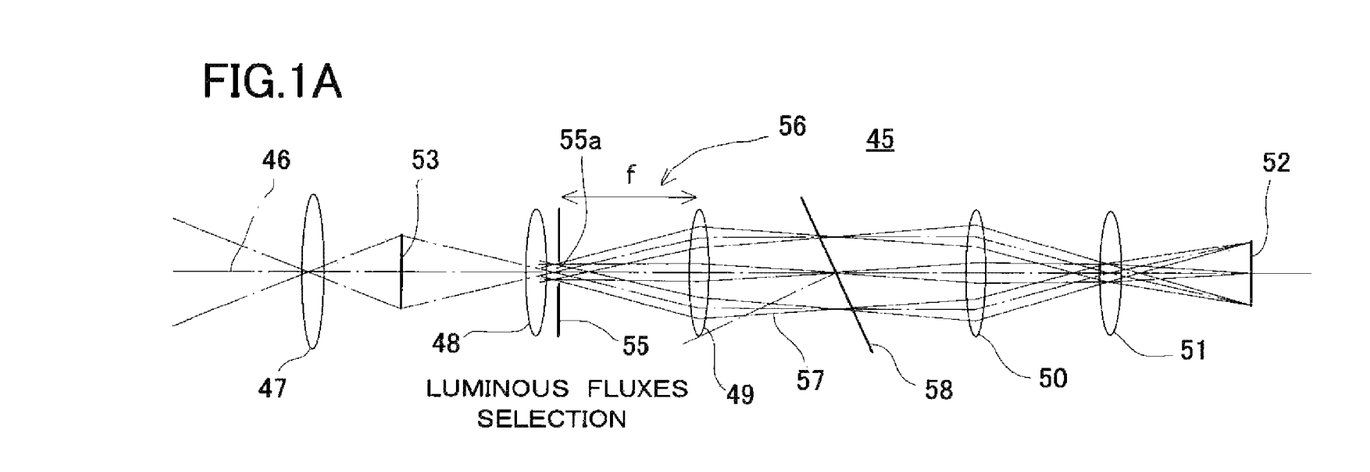
Figure 1B:
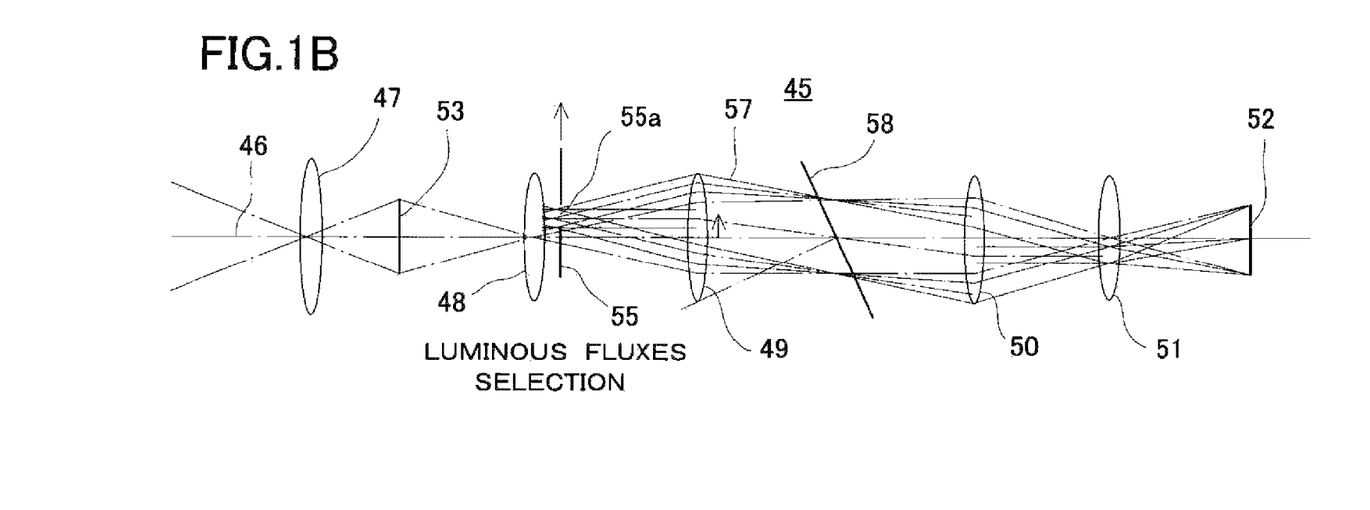

Referring to FIG. 1A and FIG. 1B, description will be given on an optical system 45 of a spectral camera, which is a spectral image sensor device according to a first embodiment of the present invention.

In each of FIG. 1A and FIG. 1B, reference numeral 46 represents an optical axis of the optical system 45. Along the optical axis 46, an objective lens 47, a first relay lens 48, a second relay lens 49, a third relay lens 50, an image forming lens 51, and an image sensor 52 such as CCD, CMOS sensor, etc. are arranged. In FIG. 1, reference numeral 53 represents an image formed by the objective lens 47, and reference symbol "f" represents a focal length of the second relay lens 49. The objective lens 47 and the first relay lens 48 schematically represent a first optical system, and the second relay lens 49 schematically represents a second optical system.

On a side of the first relay lens 48 closer to the second relay lens 49, a diaphragm 55, serving as a luminous fluxes selecting member, is provided. The diaphragm 55 has a diaphragm orifice 55a, which is a slit provided perpendicularly to paper surface in FIG. 1. The diaphragm 55 is disposed at a focal position on object side or at a focal position approximately on object side, and the diaphragm 55 is movably supported in a direction perpendicular to the optical axis 46, and also, in a direction perpendicularly crossing the diaphragm orifice 55a.

Here, the diaphragm 55 and the second relay lens 49 make up together a tele-centric optical system 56. After passing through the first relay lens 48, luminous fluxes are divided to a multiple of luminous fluxes (principal rays 57), which run in parallel to each other, by the tele-centric optical system 56.

An interference filter 58, which is an optical member, is disposed at a light converging position of the principal ray 57 (i.e. image forming position by the second relay lens 49). The interference filter 58 fulfills functions as a wavelength selecting filter. After passing through the interference filter 58, an image is formed on the image sensor 52 by the rays of specific wavelengths via the third relay lens 50 and the image forming lens 51, and a spectral image can be acquired.

Figure 2:
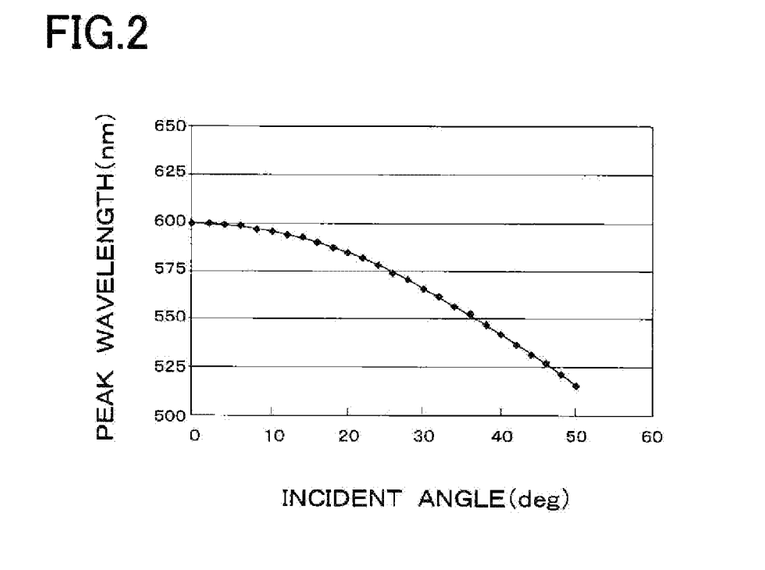
FIG. 2 is a graph to show a relation between an incident angle and a peak wavelength of a transmitting light.

The interference filter 58 has such property that wavelength selecting characteristics are changed, depending on incident angle of the rays entering the interference filter 58. FIG. 2 shows a relation between the incident angle and the peak wavelength of the rays passing through (i.e. dependency of peak wavelength on incident angle), and by changing the incident angle, it can be seen that the peak wavelength is changing.

As shown in FIG. 1A, the diaphragm orifice 55a of the diaphragm 55 is positioned on the optical axis 46. In this case, the principal ray 57 runs in parallel to the optical axis 46. Next, when the diaphragm 55 is moved as shown in FIG. 1B—for instance, when the diaphragm 55 is moved upward as shown in the figure—, the diaphragm orifice 55a is separated from the optical axis 46, and luminous fluxes selected by the diaphragm 55 come to a position separated from the optical axis 46. As a result, the principal rays 57 are tilted with respect to the optical axis 46. That is, the incident angle with respect to the interference filter 58 is changed. Therefore, by moving the diaphragm 55, it is possible to change the wavelength of the rays when the rays pass through the interference filter 58 in a predetermined wavelength range.

Figure 3:
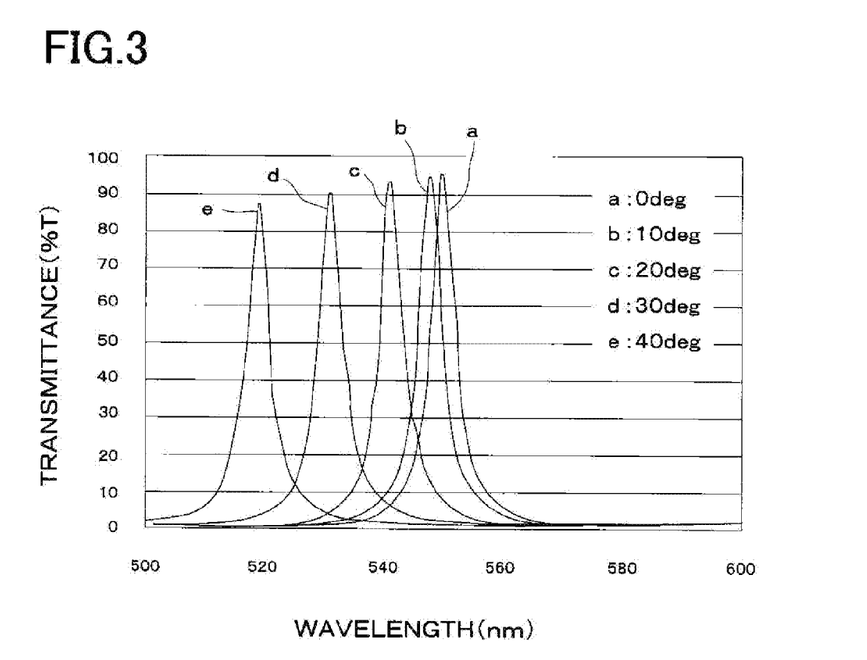
FIG. 3 is a graph to show wavelength transmission characteristics to correspond to an incident angle to an interference filter.

For instance, by referring to FIG. 2, when incident angle to the interference filter 58 is changed in a range of 0°-50°, peak of the wavelength of the light passing there is changed in the range of 600 nm-520 nm. This means that the interference filter 58 has a wavelength selecting range W in the range of 600 nm to 520 nm. FIG. 3 shows wavelength transmitting characteristics to correspond to the incident angle to the interference filter 58.

Next, as shown in FIG. 1A and FIG. 1B, the interference filter 58 is tilted with respect to the optical axis 46. As shown in FIG. 2, incidence dependency is turned to linear at a point where the incident angle exceeds 10°. Therefore, by keeping the interference filter 58 at tilted position, change of the selected wavelength with respect to displacement of the diaphragm 55 can be obtained with high efficiency.

Therefore, by acquiring an image by the image sensor 52 each time when the diaphragm 55 is displaced, spectral image can be acquired in the range of 600 nm to 520 nm when an interference filter 58 having wavelength transmitting characteristics as shown in FIG. 2 is used. In a case where a spectral image in the wavelength exceeding the range of 600 nm to 520 nm is to be acquired, the interference filter should be replaced by an interference filter with a different wavelength selecting range W'.

As described above, in the first embodiment, by merely moving the diaphragm 55, incident angle to the interference filter 58 is changed, and selected wavelength of the spectral image to be acquired can be changed. Accordingly, in a predetermined wavelength selecting range, there is no need to change an arrangement of the optical system 45 itself such as the replacement of the interference filter or the like. Therefore, it is possible to simplify the entire arrangement, and to reduce the cost because there is no need to use a diffraction grating at higher cost.

Figure 4A:
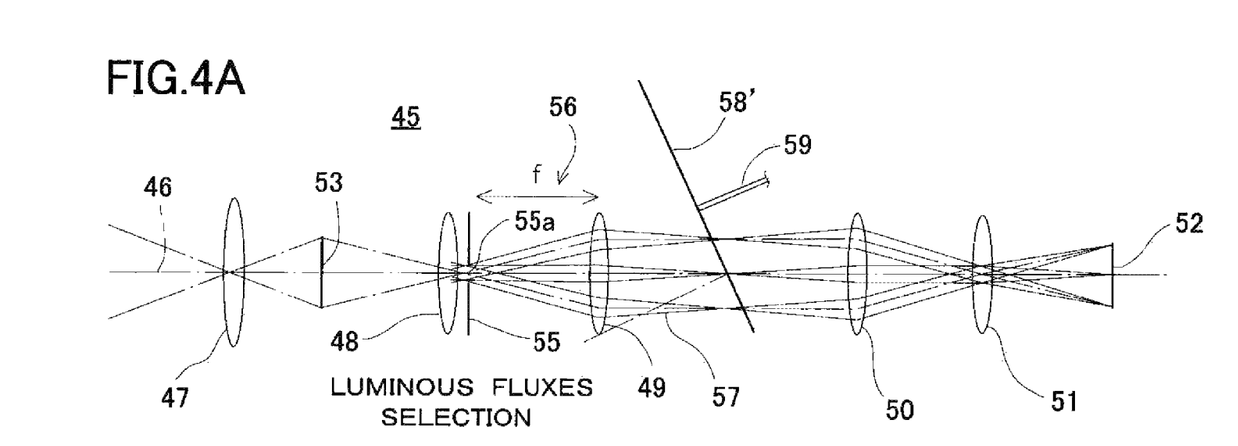
Figure 4B:
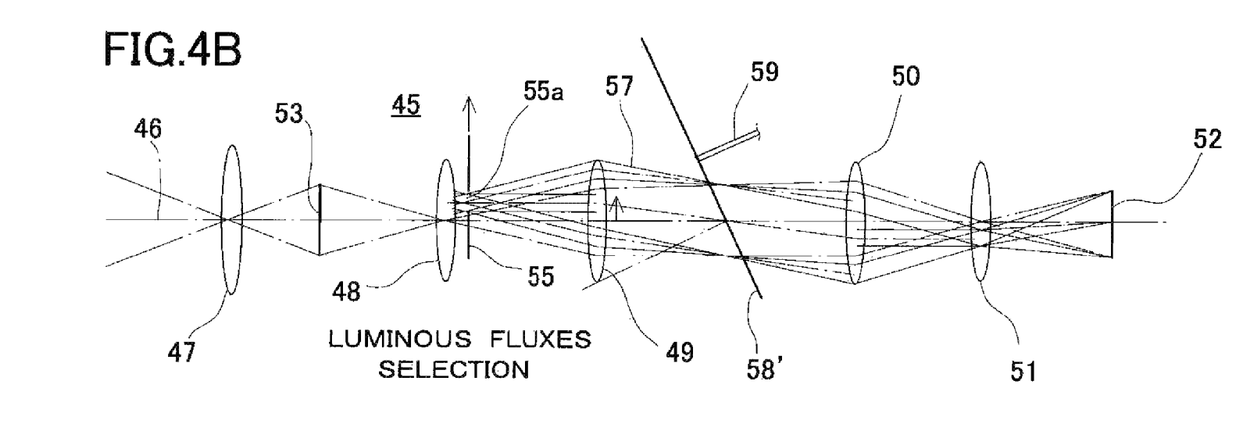

Now, referring to FIG. 4A, FIG. 4B and FIG. 5, description will be given below on an optical system 45 in a second embodiment of the present invention. In the second embodiment, an interference filter 58' is rotatably supported on a rotation axis 59 as the center. Further, by rotating means such as a motor (not shown) etc., the interference filter 58' can be rotated.

Figure 5:
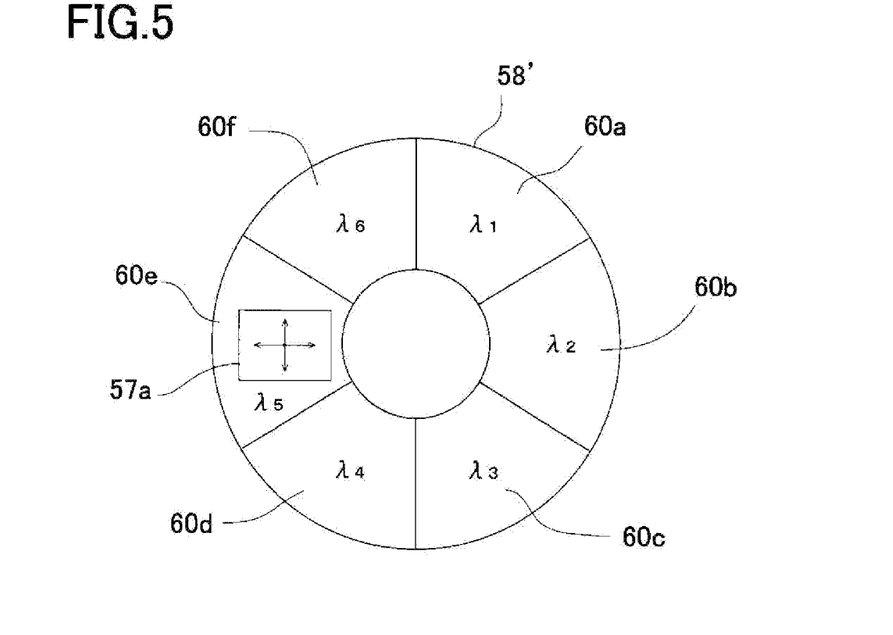
FIG. 5 is a front view to show an interference filter of a second embodiment of the present invention.

The interference filter 58' is designed in form of a disk as shown in FIG. 5. A transmitting surface is equally divided in circumferential direction, each at an angle as required (in the figure, the transmission surface is divided to 6 equal portions) and divided transmission surfaces 60a to 60f are formed. and transmission interference membranes having different wavelength selecting characteristics with selected wavelengths $\lambda 1$-$\lambda 6$ are formed for each of the divided transmission surfaces 60a-60f.

For instance, a transmission interference membrane with selected wavelength $\lambda 1$ of 400 nm to 450 nm is formed on the divided transmission surface 60a. Further, a transmission interference membrane with the selected wavelength $\lambda 2$ of 450 nm to 525 nm is formed on the divided transmission surface 60b, and a transmission interference membrane with the selected wavelength $\lambda 3$ of 525 nm to 650 nm is formed on the divided transmission surface 60c, and a transmission interference membrane with the selected wavelength $\lambda 4$ of 650 nm to 750 nm is formed on the divided transmission surface 60d. Also, a transmission interference membrane with the selected wavelength $\lambda 5$ of 750 nm to 870 nm is formed on the divided transmission surface 60e, and a transmission interference membrane with the selected wavelength $\lambda 6$ of 870 nm to 950 nm is formed on the divided transmission surface 60f.

The luminous fluxes after passing through the interference filter 58' are designed to form an image on an image sensor 52 after passing through a third relay lens 50 and an image forming lens 51. In FIG. 5, reference number 57a represents an image where an image is formed by a principal rays 57 through the interference filter 58'.

Figure 7:
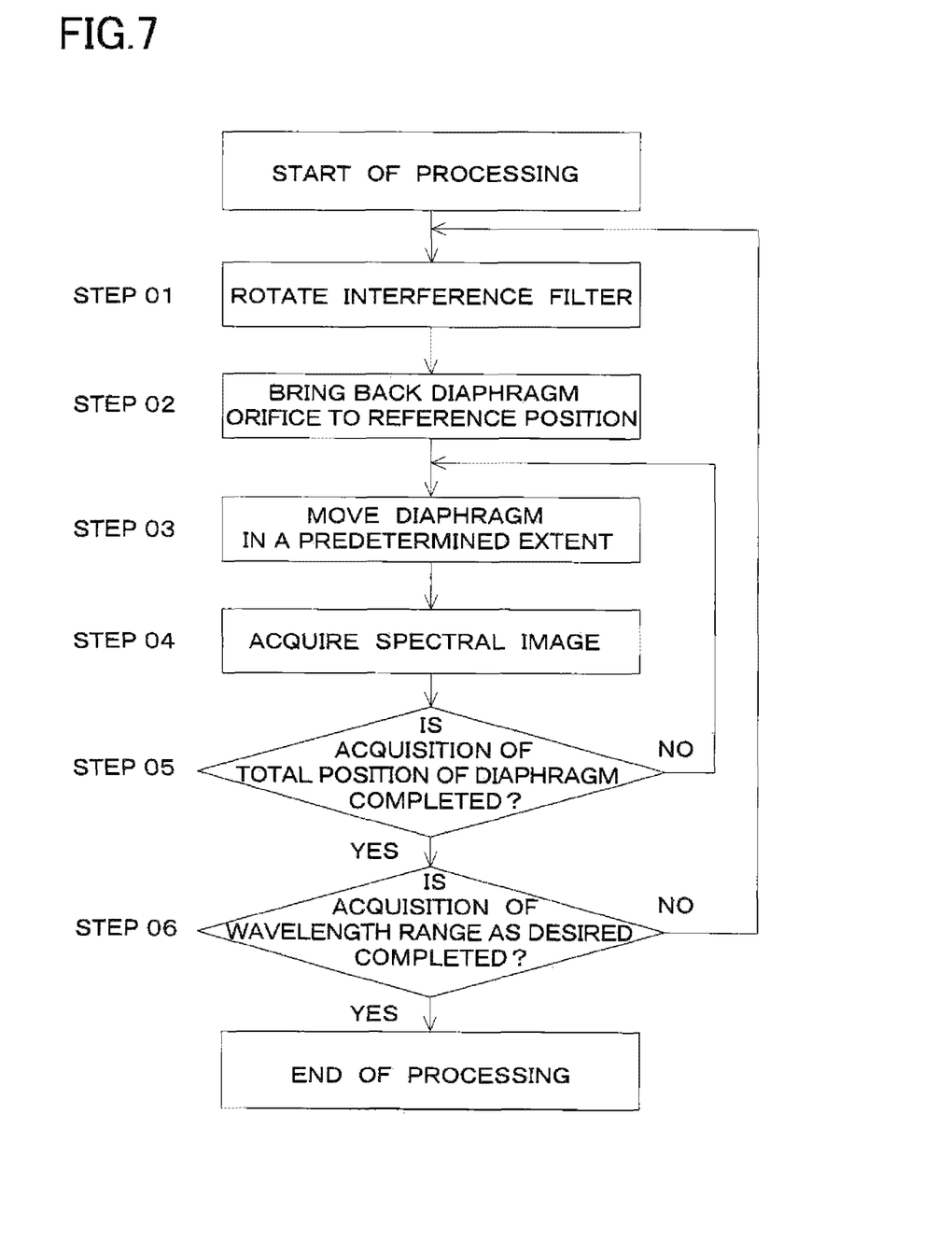
FIG. 7 is a flow chart to explain a processing to acquire a spectral image according to a second embodiment of the present invention.

Next, referring to a flow chart shown in FIG. 7, description will be given on a processing to acquire a spectral image of the second embodiment when the interference filter 58' is used.

(Step 01) First, when the processing to acquire the spectral image is started, the interference filter 58' is rotated as to correspond to the wavelength range of the spectral image as required, for instance, so that the divided transmission surface 60a coincides with an optical axis 46.

(Step 02) In synchronization with the rotation of the interference filter 58' in Step 01, a diaphragm 55 is moved, and a diaphragm orifice 55a is brought back to a reference position.

(Step 03) After the diaphragm orifice 55a has been brought back to the reference position, the diaphragm 55 is moved in a predetermined extent (by forwarding stepwise).

(Step 04) When positions of the interference filter 58' and the diaphragm 55 are set up, image pickup is started, and the image is transmitted through the interference filter 58'. An image is formed on the image sensor 52 by the luminous fluxes selected at a specific wavelength, and a spectral image at a preset position of the diaphragm 55 in a predetermined range of the selected wavelength $\lambda 1$ is acquired.

(Step 05) When the spectral image is acquired, it is judged whether the spectral images have been acquired or not at all of the positions of the diaphragm 55. If the spectral images at all of the positions have not been acquired, the position of the diaphragm 55 is moved as necessary in accordance with the processing of Step 03 again, and the processing to acquire the spectral image in Step 04 is performed. When it is judged that the spectral images at all of the positions have been acquired, the procedure proceeds to Step 06.

(Step 06) After the spectral images at all of the positions of the diaphragm 55 have been acquired, it is judged whether the spectral images in the wavelength range as desired have been acquired or not. In a case where the acquisition of the spectral images in the wavelength range as desired is not completed yet, i.e. in a case where the wavelength range of the spectral image to be acquired exceeds the selected wavelength range of $\lambda 1$, the interference filter 58' is rotated so that the optical axis 46 coincides with the divided transmission surface 60b, and the processing in Step 02 to Step 05 is carried out again.

When all of the spectral images in the wavelength range as desired have been acquired, all spectral images are synthesized, and the processing of the acquisition of the spectral images is completed.

For instance, it may be arranged in such a manner that the interference filter 58' is continuously rotated, and the diaphragm orifice 55a is brought back to the reference position, depending on the rotation of the interference filter 58'. It is also so arranged that the diaphragm 55 is sequentially forwarded stepwise and the spectral image is acquired for each of the steps within the same divided transmission surface, and that the rotation of the interference filter 58' in Step 01 will be mechanically synchronized with the moving of the diaphragm 55 in Step 02.

According to the second embodiment as described above, it is possible to acquire the spectral image in the wavelength range, which exceeds the range of 600 nm to 520 nm (see FIG. 2), by simply rotating the interference filter 58' without replacing the interference filter. As a result, the cost can be reduced without using a plurality of the interference filters 58' separately, and it is possible to quickly acquire the spectral images in the wavelength range in wide extent.

Further, the interference filter 58' may be designed in form of a disk and can be rotated, while the interference filter 58' may be designed in form of a long rectangle, and the interference filter 58' is divided in longitudinal direction and the divided transmission surfaces 60a to 60f are formed. Also, it may be so arranged that the interference filter 58' is slid in longitudinal direction by position changing means such as a linear motor etc., and the divided transmission surfaces 60a to 60f may be changed over.

Next, description will be given below on a third embodiment of the present invention. In the third embodiment, it is so arranged that an interference filter 58' in the second embodiment is changed to an interference filter 58". It is a preferred embodiment when a spectral camera is provided on board of a moving vehicle such as a helicopter or the like where vibration may occur. In the third embodiment, the arrangement other than the interference filter 58" is the same as in the second embodiment, and description will be given below by referring to FIG. 4A, FIG. 4B, and FIG. 6.

Figure 6:
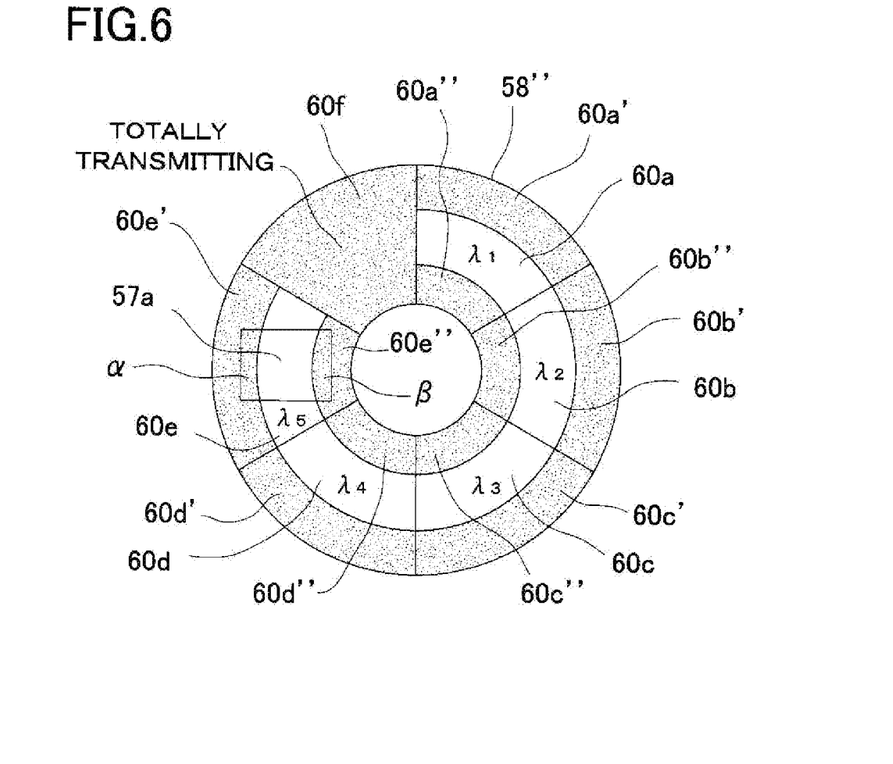
FIG. 6 is a front view to show an interference filter in a third embodiment of the present invention.

In the interference filter 58", it is so arranged that, among the divided transmission surfaces 60a to 60f, the divided transmission surface 60f is designed as a full transmission surface where the rays with any wavelengths can be transmitted. Further, on each of the divided transmission surfaces 60a to 60e, outer peripheral portions 60a' to 60e' and inner peripheral portions 60a" to 60e" are designed as full transmission surfaces. In an image 57a to be formed on the interference filter 58", a part of outer peripheral side is overlapped on the outer peripheral portions 60a' to 60e', and a part of inner peripheral side is overlapped on the inner peripheral portions 60a" to 60e".

In a case where the interference filter 58" is used, the divided transmission surface 60f is selected. When the divided transmission surface 60f is concurred with an optical axis 46, full transmission is performed without wavelength selection, and a real image is acquired. When one of the divided transmission surfaces 60a to 60e is selected, e.g. when the divided transmission surface 60e is selected, wavelength is selected on a transmission interference membrane on the divided transmission surface 60e, and full transmission is performed, among the formed image 57a, on a portion $\alpha$ to transmit the outer peripheral portion 60e' and on a portion $\beta$ to transmit the inner peripheral portion 60e".

Figure 8:
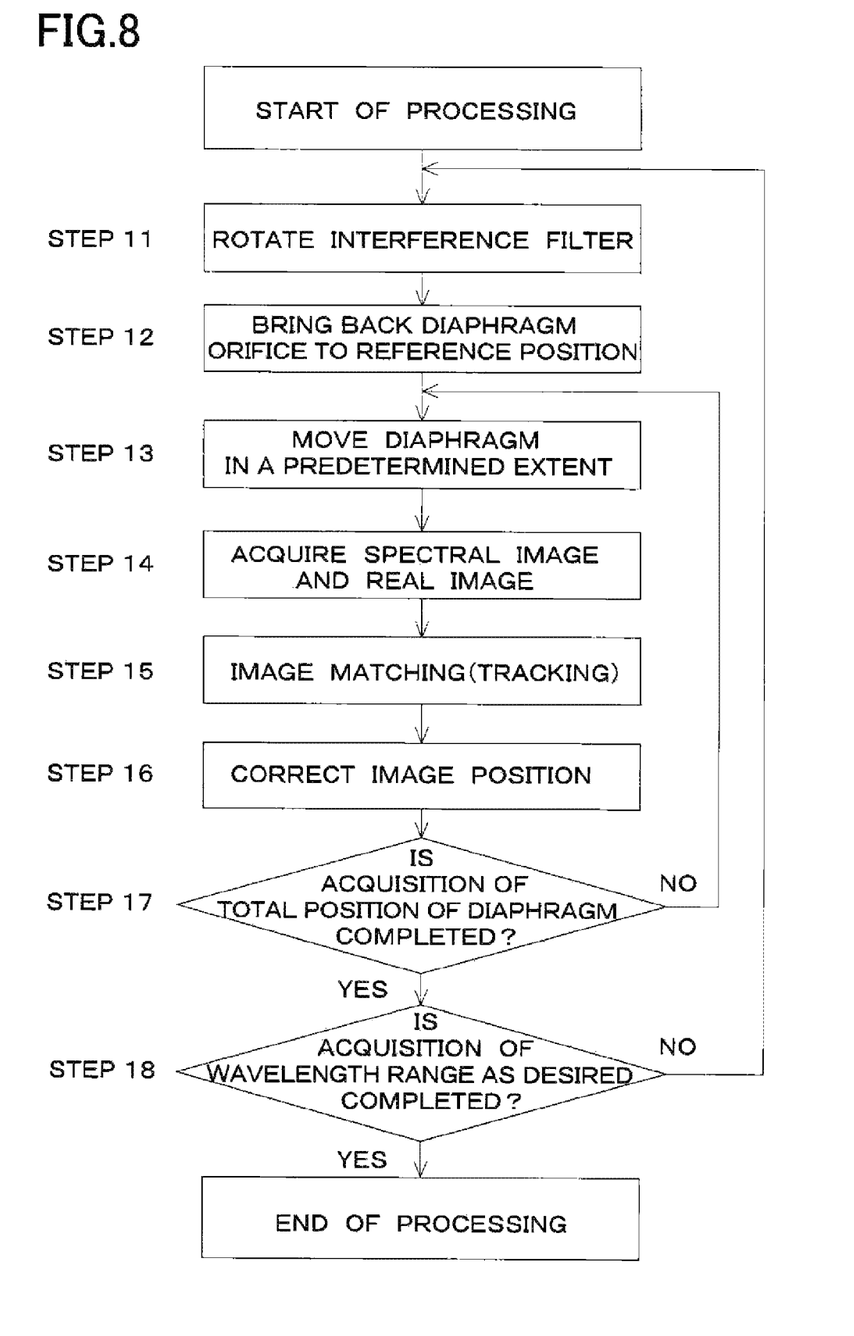
FIG. 8 is a flow chart to explain a processing to acquire a spectral image according to a third embodiment of the present invention.

Next, referring to the flow chart of FIG. 8, description will be given on the processing to acquire the spectral image in the third embodiment where the interference filter 58" is used. The procedure in Step 11 to Step 13 is the same as the procedure in Step 01 to Step 03 in FIG. 7, and detailed description is not given here.

(Step 14) When the positions of the interference filter 58" and a diaphragm 55 are set up, image pickup is started. Transmitting of luminous fluxes is performed on the divided transmission surfaces 60a to 60f, and by the luminous fluxes selected to a specific wavelength, a spectral image is formed on the image sensor 52, and a real image is acquired by the luminous fluxes, which are transmitted on full transmission portions $\alpha$ and $\beta$ on the outer peripheral positions 60a' to 60e' and on the inner peripheral portions 60a" to 60e".

(Step 15) When the spectral image and the real image are acquired, feature points are extracted by the procedure such as edge processing of the real image or other processings. Then, based on the feature points thus extracted, tracking is carried out between real images, which are adjacent to each other in terms of time, and the feature point is specified in the next image. Based on the feature point thus extracted and on the specified feature point, matching of the images is performed. Here, the real image and the spectral image form a single image, and if image matching is performed by the real image, the matching of the spectral image is also completed at the same time. The image matching is described in the Japanese Patent Publication JP-A-2006-10376.

(Step 16) After the matching between the images is performed, the feature point of the spectral image thus extracted is processed by image coordinate conversion, and based on the coordinates, image position of the spectral image processed by the matching is corrected according to the coordinates.

(Step 17) After image positions of the spectral image have been corrected, it is judged whether the spectral images at all positions of the diaphragm 55 have been acquired or not. In a case where all images are not acquired yet, the processing in Step 13 to Step 17 is carried out.

(Step 18) After the spectral images at all of the positions of the diaphragm 55 have been acquired, it is judged whether the spectral images in the wavelength range as desired have been acquired or not. In a case where the spectral images in the wavelength range as desired are not acquired, the interference filter 58" is rotated further (Step 11), and the processing in Step 12 to Step 17 is carried out again.

As described above, in the third embodiment, the outer peripheral portions 60a' to 60e' and the inner peripheral portions 60a" to 60e" which are the full transmission surfaces are formed on the divided transmission surfaces 60a to 60f. As a result, not only the spectral image but also a real image can be acquired by the luminous fluxes, which have transmitted through the outer peripheral portions 60a' to 60e' and the inner peripheral portions 60a" to 60e". Therefore, there is no need to provide a camera for carrying out the extraction of the feature points and the tracking between the spectral images, and the reduction of the cost can be achieved.

Because the matching can be performed easily between the spectral images thus acquired, the present embodiment can also be applied to a case where a spectral camera is mounted on board of the moving vehicle such as a helicopter or the like where blurring may occur due to vibration.

Figure 9A:
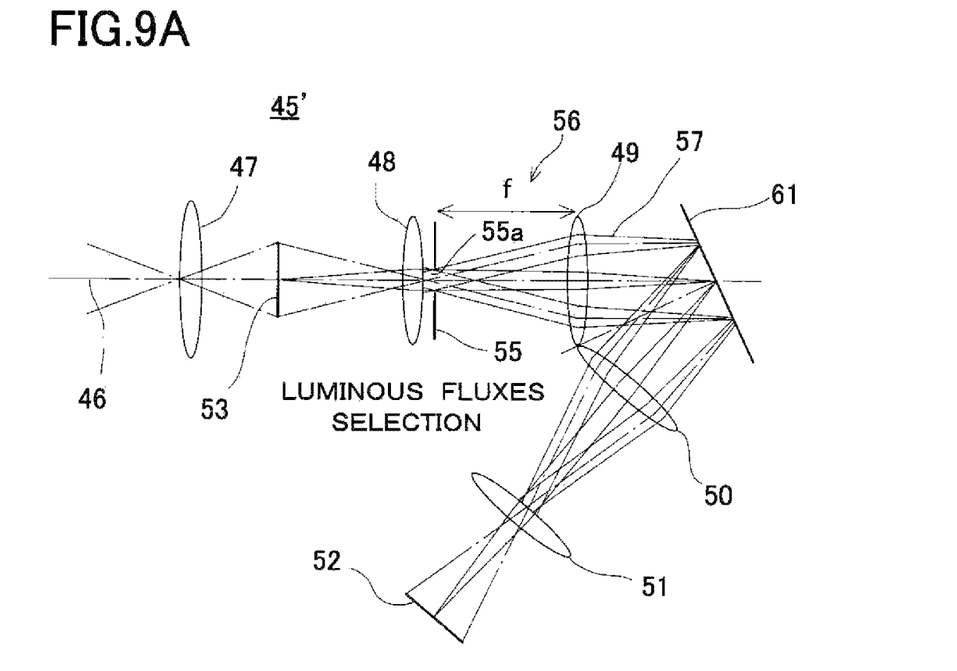
Figure 9B:
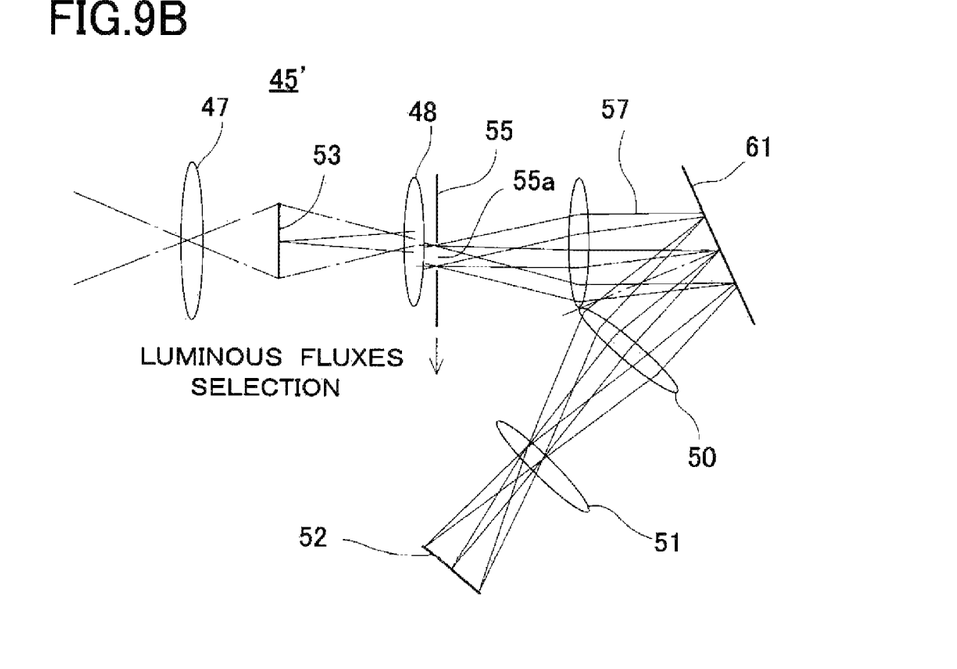

Next, referring to FIG. 9A and FIG. 9B, description will be given on a fourth embodiment of the present invention. In FIG. 9A and FIG. 9B, the same component as shown in FIG. 1A or in FIG. 1B is referred by the same symbol, and detailed description is not given here.

In an optical system 45 in the first embodiment, a transmission type interference filter 58 is used. As shown in FIG. 9A and FIG. 9B, an optical system 45' is made up by using a reflection type interference filter 61 in the fourth embodiment. In the optical system 45', wavelength is selected when the light is reflected by the interference filter 61.

An objective lens 47, a first relay lens 48, a diaphragm 55 and a second relay lens 49 are arranged along an optical axis 46, and the interference filter 61 is provided at a tilted position opposite to the second relay lens 49. On the optical axis 46 deflected by the interference filter 61, a third relay lens 50, an image forming lens 51, and an image sensor 52 are provided. Luminous fluxes reflected by the interference filter 61 pass through the image forming lens 51 and an image is formed on the image sensor 52, and a spectral image is acquired by the image sensor 52.

As shown in FIG. 9B, the diaphragm 55 is moved and position of a diaphragm orifice 55a is displaced. Then, incident angle with respect to the interference filter 61 can be changed, and the wavelength to be reflected by the interference filter 61 can be changed. The procedure of the operation to acquire the spectral image is the same as in the first embodiment, and detailed description is not given here.

Figure 10A:
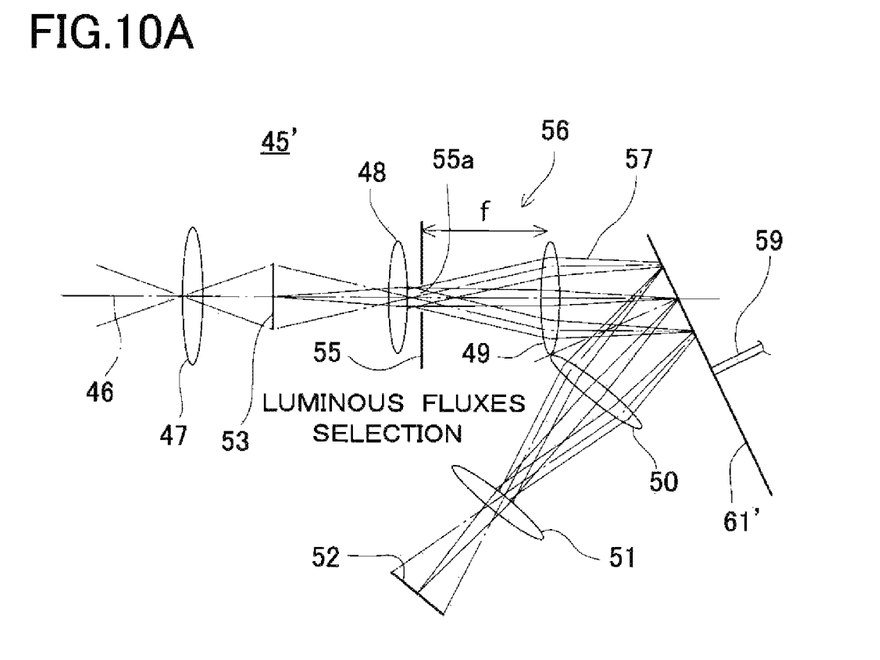
Figure 10B:
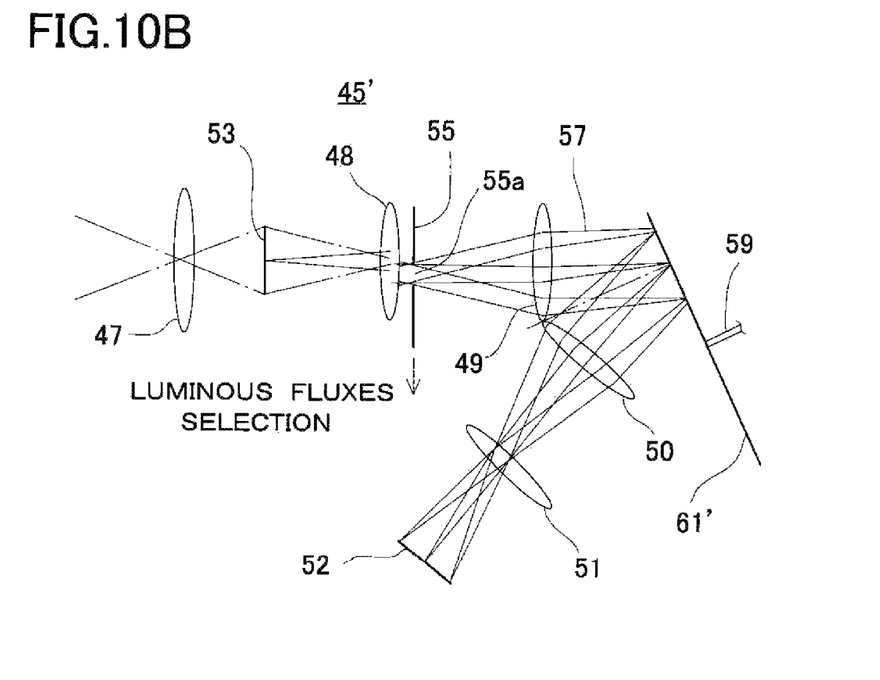
Figure 11:
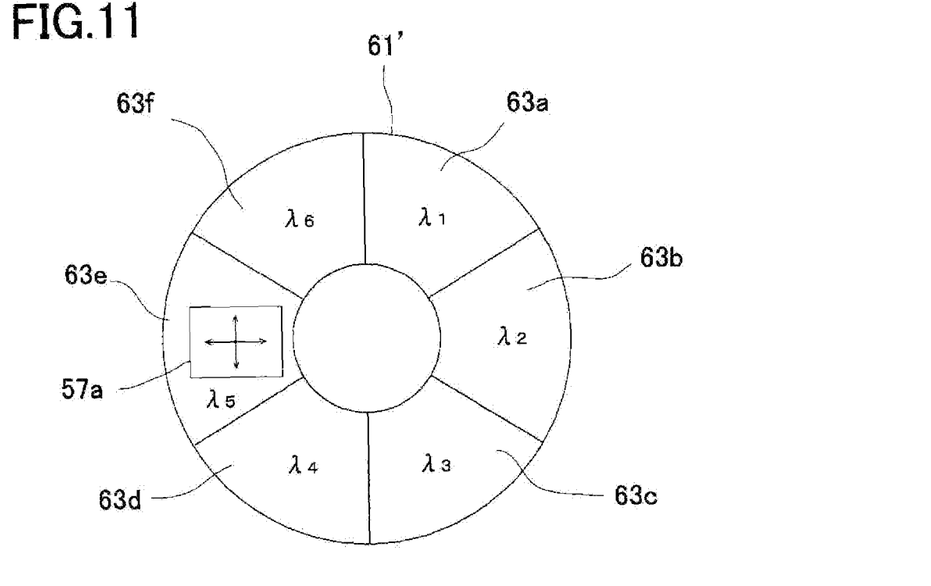
FIG. 11 is a front view to show an interference filter in a fifth embodiment of the present invention.

Next, referring to FIG. 10A, FIG. 10B and FIG. 11, description will be given on a fifth embodiment of the present invention. In the fifth embodiment, an interference filter 61' is rotatably supported on a rotation axis 59 as the center, and the interference filter 61' can be rotated by rotating means such as a motor or the like. In FIG. 10A, FIG. 10B, and FIG. 11, the same component as shown in FIG. 9A or FIG. 9B is referred by the same symbol, and detailed description is not given here.

The interference filter 61' is designed in form of a disk as shown in FIG. 11. On the reflection surface, divided reflection surfaces 63a to 63f, as equally divided in circumferential direction at an angle required (divided in 6 equal portions in the figure), and for the divided reference surfaces 63a to 63f, reflection interference membranes are formed respectively. The reflection interference membranes have different wavelength selecting characteristics with the selected wavelengths $\lambda 1$ to $\lambda 6$.

It is so designed that the luminous fluxes reflected by the interference filter 61' form images on an image sensor 52 via a third relay lens 50 and an image forming lens 51. Similarly to the case of the second embodiment, by rotating the interference filter 61' and by sequentially changing over the divided reflection surfaces 63a to 63f, a diaphragm 55 is moved for each of the divided reflection surfaces 63a to 63f. As a result, the luminous fluxes reflected by the divided reflection surfaces 63a to 63f form spectral images in the wavelength range as desired.

In the fifth embodiment, it is so designed that luminous fluxes are not allowed to pass through but are reflected by the interference filter 61'. Thus, total length of an optical system 45' can be shortened, and the spectral camera can be designed in compact size. The operation in the fifth embodiment is similar to the operation of the second embodiment, and detailed description is not given here.

Next, description will be given on a sixth embodiment of the present invention. The sixth embodiment has such a configuration that an interference filter 61' in the fifth embodiment is changed to an interference filter 61", and it is a preferred embodiment when a spectral camera is mounted on board of a moving vehicle such as a helicopter or the like where vibration may occur. In the sixth embodiment, the configuration other than the interference filter 61" is the same as the configuration of the fifth embodiment, and description will be given below by referring to FIG. 10A, FIG. 10B and FIG. 12.

Figure 12:
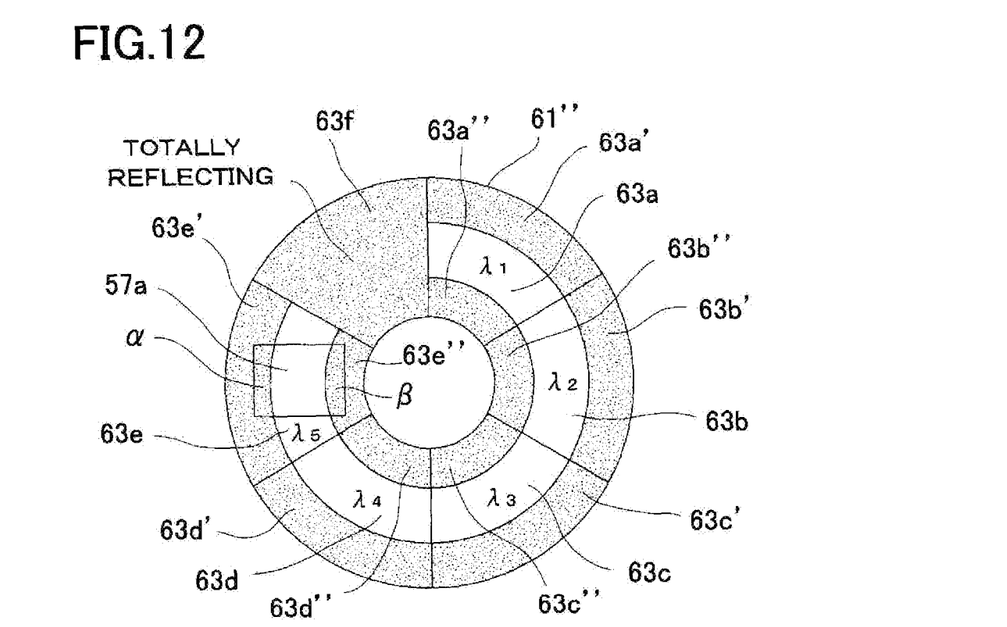
FIG. 12 is a front view to show an interference filter in a sixth embodiment of the present invention.

In the interference filter 61", among divided reflection surfaces 63a to 63f, the divided reflection surface 63f is designed to have a full reflection surface for reflecting all of the wavelengths. Further, in the divided reflection surfaces 63a to 63e, outer peripheral portions 63a' to 63e' and inner peripheral portions 63a" to 63e" are prepared as full reflection surfaces. For images 57a to be formed on the interference filter 61", a part on a side of the outer periphery is overlapped on the outer peripheral portions 63a' to 63e', and a part on a side of the inner periphery is overlapped on the inner peripheral portions 63a" to 63e".

In a case where the interference filter 61" is used, the divided reflection surface 63f is selected, and in a case where an optical axis 46 is concurred with the divided reflection surface 63f, the wavelength is not selected and the luminous fluxes are fully reflected, and a real image can be acquired. In a case where one of the divided reflection surfaces 63a to 63e is selected, e.g. in a case where the divided reflection surface 63e is selected, wavelength is selected on the reflection interference membrane on the divided reflection surface 63e, and the luminous fluxes are fully reflected on a portion α for reflecting the outer peripheral portion 63e' and a portion β for reflecting the inner peripheral portion 63e" among the images 57a.

It is so designed that the luminous fluxes reflected by the interference filter 61" form images on an image sensor 52 via a third relay lens 50 and an image forming lens 51. The luminous fluxes reflected by the divided reflection surfaces 63a to 63f are acquired as spectral images in the wavelength range as desired, and the luminous fluxes reflected by the outer peripheral portions 63a' to 63e' and by the inner peripheral portions 63e" to 63e" are acquired as real images. Therefore, it is possible to perform tracking between the spectral images and correction of the image positions by using the real images acquired, and the present embodiment can be applied even in a case where the spectral camera is mounted on board of a moving vehicle such as a helicopter or the like where vibration may occur. The operation in the sixth embodiment is the same as the operation of the third embodiment, and detailed description is not given here.

Figure 13A:
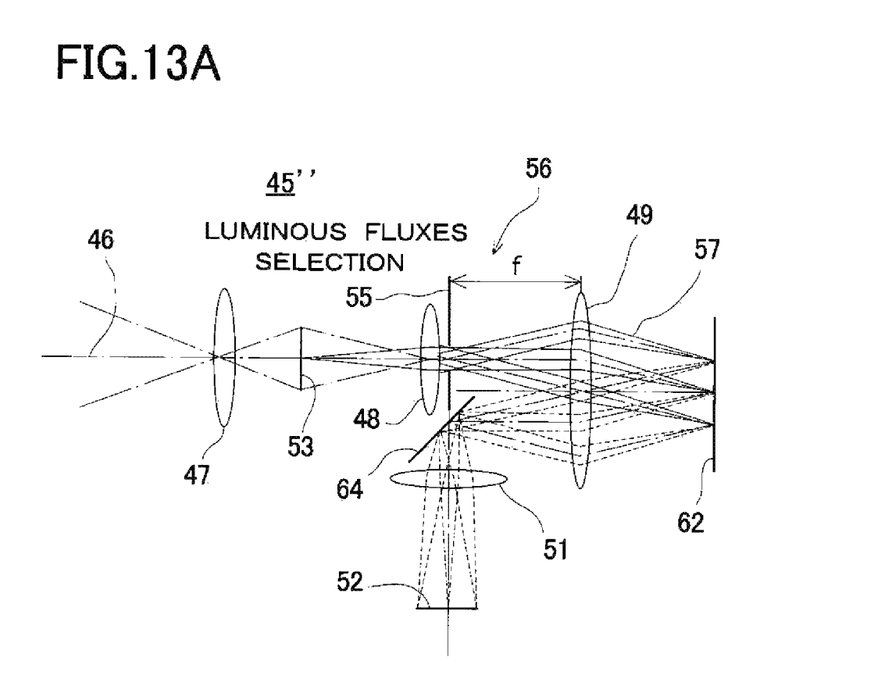
Figure 13B:
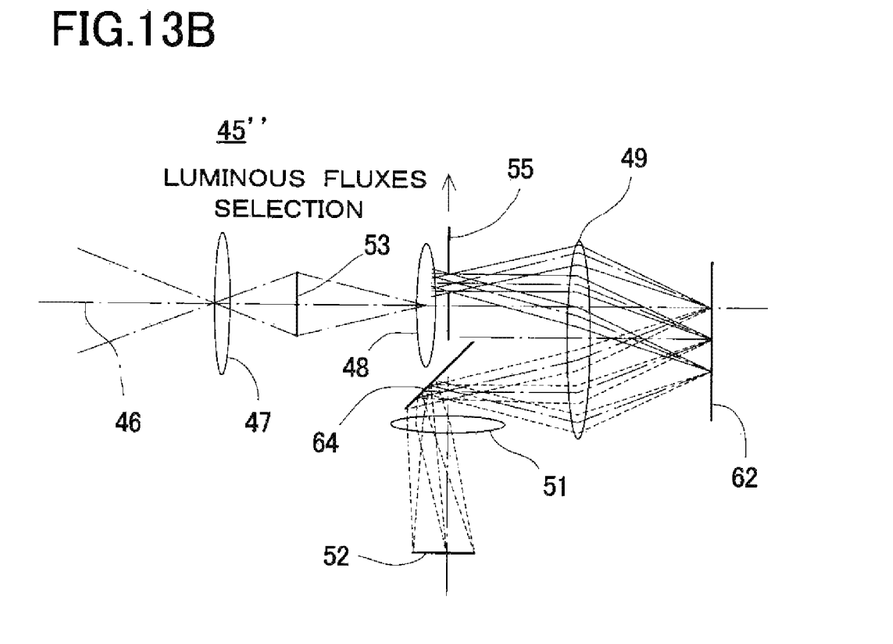

Next, referring to FIG. 13A and FIG. 13B, description will be given on a seventh embodiment of the present invention. In FIG. 13A and FIG. 13B, the same component as shown in FIG. 1A and FIG. 1B is referred by the same symbol, and detailed description is not given here.

In the optical system 45″ in the seventh embodiment, an objective lens 47, a first relay lens 48, and a diaphragm 55 are disposed along an optical axis 46, and a second relay lens 49 is disposed along an optical axis, which runs in parallel to and is separated to some extent from the optical axis 46, and an interference filter 62 is provided at a position opposite to the second relay lens 49. The luminous fluxes reflected by the interference filter 62 are deflected by a reflection mirror 64 after passing through the second relay lens 49, and the luminous fluxes thus deflected form images on an image sensor 52 after passing through an image forming lens 51.

In the seventh embodiment, the first relay lens 48 and the diaphragm 55 are disposed at the positions deviated from the optical axis of the second relay lens 49, and principal rays 57 as divided by a tele-centric optical system 56 enter the interference filter 62 in tilted manner. Further, as shown in FIG. 13B, if the diaphragm 55 is moved so as to separate from the optical axis 46, incident angle of the principal ray 57 will be larger. Therefore, by moving the diaphragm 55, the wavelength to be selected can be changed.

In a case where the wavelength range of the spectral image to be obtained is in the range of 400 nm to 950 nm, for instance, the interference filter 62 can be changed to an interference filter 61′ of the fifth embodiment (see FIG. 11) or may be changed to an interference filter 61″ (see in FIG. 12) in the sixth embodiment.

For instance, in a case where the interference filter 61′ is applied, divided reflection surfaces 63a to 63f are sequentially changed from the divided reflection surface 63a to the divided reflection surface 63f. Then, the diaphragm 55 is moved for each of the divided reflection surfaces 63 thus changed, and images are acquired at wavelength for each of the moved positions of the diaphragm 55. The changeover of the divided reflection surfaces 63a to 63f and the moving of the diaphragm 55 are carried out in synchronization with each other, and each time the divided reflection surfaces 63 are changed over, the diaphragm 55 is moved from the optical axis 46 so that slit orifice is separated from the optical axis 46.

As a result, the wavelengths of 400 nm to 950 nm can be continuously selected, the images are acquired at the image sensor 52 for each of the selected wavelengths, and spectral images for the whole range of 400 nm to 950 nm can be acquired.

In a case where the range of the spectral images to be obtained is limited, spectral images may be acquired by selecting the divided reflection surface having the wavelength selecting characteristics as appropriate.

Because the reflection type interference filter 62 is used in the seventh embodiment, the optical system 45″ can be provided in compact design. Also, because the second relay lens 49 also serves the third relay lens 50 in the first to the sixth embodiments, the number of components to be used can be decreased, and the reduction of the total cost can be achieved.

The invention claimed is:

1. A spectral image sensor device, comprising a first optical system including an objective lens, a luminous fluxes selecting member for allowing a part of the luminous fluxes to pass via the first optical system selectively, an optical member where said luminous fluxes selecting member is disposed so as to be at focal position on an object side or approximately at focal position on an object side, and an interference membrane is formed, and wavelength range of the luminous fluxes for passing through the luminous fluxes selecting member is selected, depending on position of said luminous fluxes selecting member, a second optical system for guiding the luminous fluxes toward said optical member, and an image sensor for receiving a light in wavelength range as selected by said optical member.

2. A spectral image sensor device according to claim 1, wherein said luminous fluxes selecting member has a slit, and a tele-centric optical system is constituted by said slit and said second optical system.

3. A spectral image sensor device according to claim 2, wherein said optical member is disposed at an image forming position or approximately at an image forming position of said tele-centric optical system.

4. A spectral image sensor device according to one of claims 1 to 3, wherein said optical member is disposed at tilted position with respect to the optical axis of said second optical system.

5. A spectral image sensor device according to one of claims 2 to 3, wherein incident angle of the light entering said optical member is changed according to a position of said slit.

6. A spectral image sensor device according to claim 1, wherein said optical member is a transmission type interference filter.

7. A spectral image sensor device according to claim 1, wherein said optical member is a reflection type interference filter.

8. A spectral image sensor device according to claim 6 or 7, wherein said optical member is divided to a plurality of sites, and interference membranes with different wavelength characteristics are formed at each of the divided sites.

9. A spectral image sensor device according to claim 8, wherein changeover of wavelength characteristics due to the changeover of said plurality of sites is synchronized with change of the position of said luminous fluxes selecting member.

10. A spectral image sensor device according to claim 6, wherein a full transmission range is provided at least in a part of said optical member, and said image sensor acquires at least a part of the light from said full transmission range as a real image at the same time as the spectral image.

11. A spectral image sensor device according to claim 7, wherein a full reflection range is provided in at least a part of the optical member, and said image sensor acquires at least a part of the light from said full reflection range as a real image at the same time as the spectral image.

12. A spectral image sensor device according to claim 10 or 11, wherein said real image and said spectral image are acquired at the same time, image matching is performed between real images, and positioning between a plurality of the spectral images is performed according to said image matching.

* * * * *